Dec. 15, 1964    J. E. KENNETT    3,161,308
MECHANICAL HANDLING AND GRIPPING APPARATUS
Filed March 6, 1961    5 Sheets-Sheet 1

Dec. 15, 1964    J. E. KENNETT    3,161,308
MECHANICAL HANDLING AND GRIPPING APPARATUS
Filed March 6, 1961    5 Sheets-Sheet 2

Dec. 15, 1964 J. E. KENNETT 3,161,308
MECHANICAL HANDLING AND GRIPPING APPARATUS
Filed March 6, 1961 5 Sheets-Sheet 3

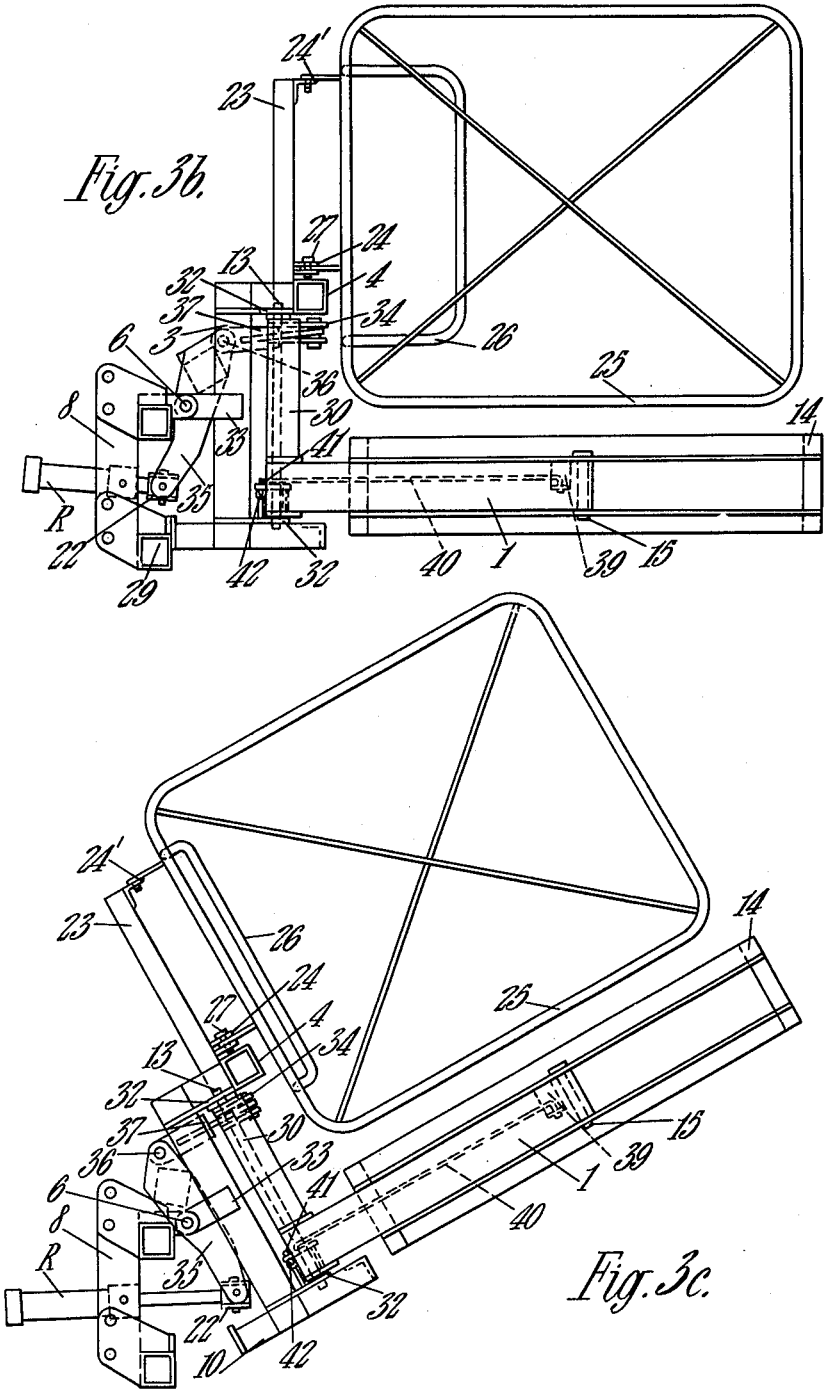

Dec. 15, 1964        J. E. KENNETT        3,161,308

MECHANICAL HANDLING AND GRIPPING APPARATUS

Filed March 6, 1961                   5 Sheets-Sheet 5

United States Patent Office 3,161,308
Patented Dec. 15, 1964

3,161,308
MECHANICAL HANDLING AND GRIPPING
APPARATUS
John England Kennett, 5 St. Michael's Close,
Bury St. Edmunds, England
Filed Mar. 6, 1961, Ser. No. 93,467
Claims priority, application Great Britain Mar. 7, 1960
9 Claims. (Cl. 214—147)

This invention relates to apparatus for the mechanical handling of materials by a gripping process and is particularly, although not exclusively, for use in connection with an agricultural or industrial tractor.

The present invention accordingly consists in a load gripping device for loads such as bales and conatiners. The device comprises a pair of arms connected to a frame in such a manner as to be able to pivot about vertical axis and about horizontal axis. Means are provided for causing the arms first to squeeze opposite sides of a load and then to be tilted upwards.

The invention will now be described, by way of example, with reference to the accompanying diagrammatic drawings in which:

FIGURE 3b is a side view of the apparatus shown in FIGURES 3 and 3a when attached to a rigid frame, the frame being similar to that shown in FIGURES 1 and 2.

FIGURE 3c is a side view of the apparatus shown in FIGURES 3 to 3b after the load has been gripped and tilted.

Figure 1:
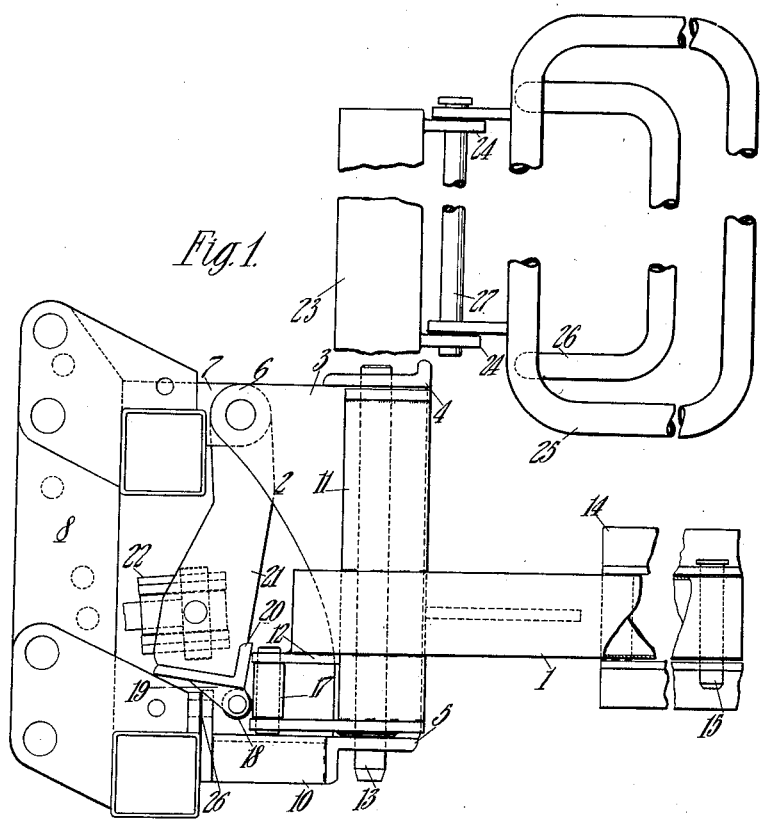
FIGURE 1 is a side elevation of mechanical handling apparatus according to the present invention.
Figure 2:
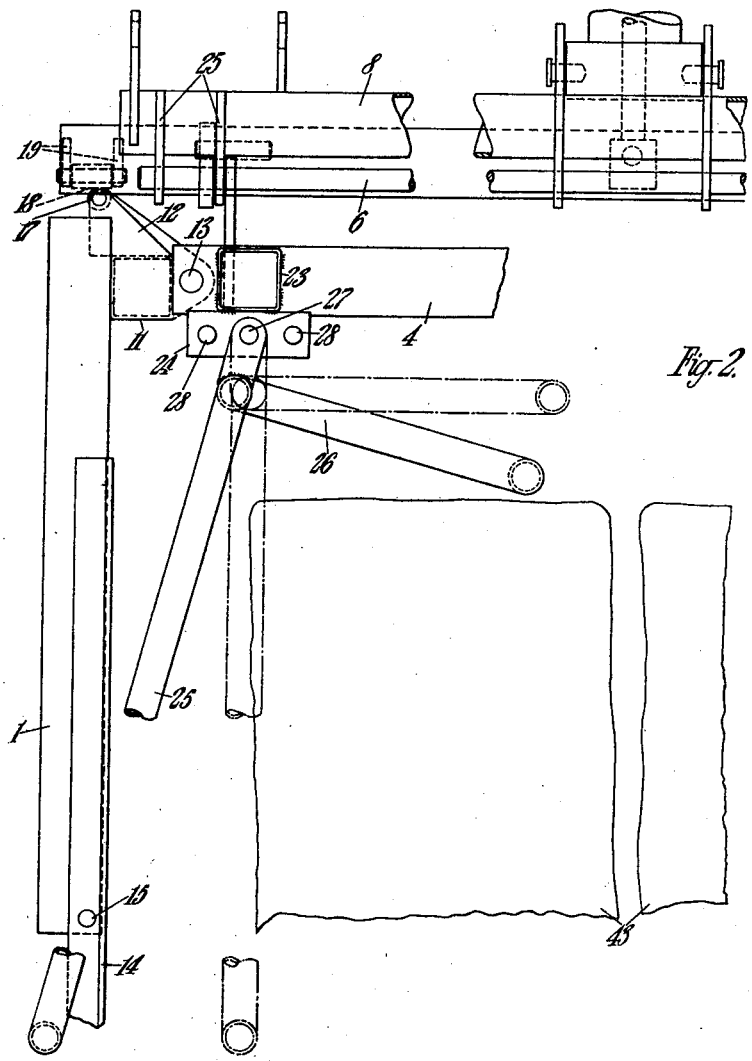
FIGURE 2 is a part plan view of the apparatus shown in FIGURE 1.

Referring firstly to FIGURES 1 and 2, as shown, there are provided load engaging arms 1 mounted on a sub-frame 2 adapted to be secured to a rigid frame 8 such as is described in my British patent specification No. 92,218 suitable for attachment to the arms of a tractor mounted hydraulic loader or three-point linkage of a tractor.

Figure 3:
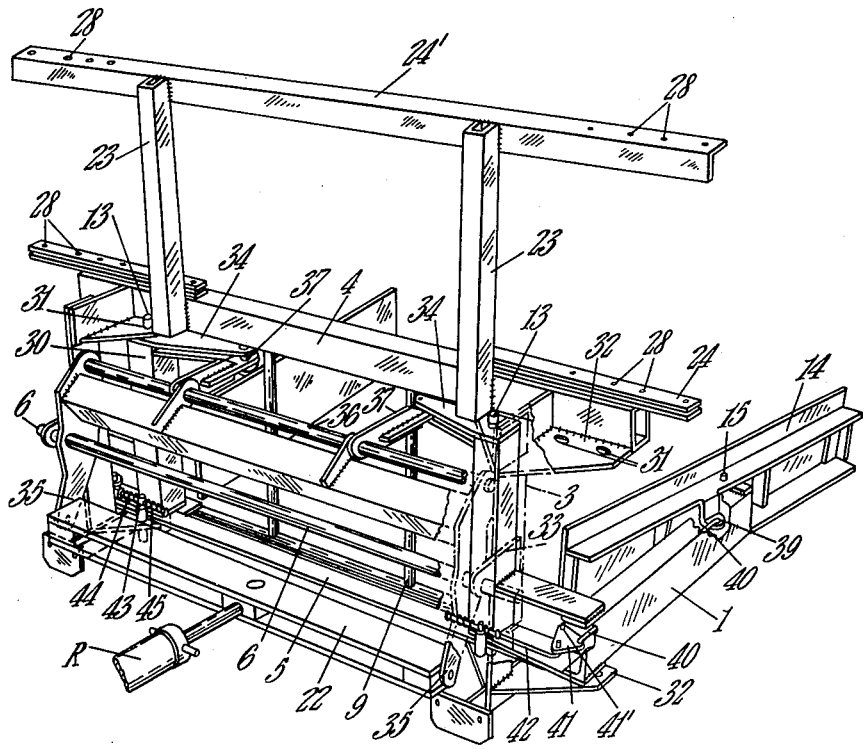
FIGURE 3 is a rear perspective view of modified mechanical handling apparatus according to the present invention.

The sub-frame comprises a pair of vertically disposed plates 3 interconnected at their forward ends by cross bars 4 and 5 rigidly secured to the upper and lower corners of the plates 3. The upper rear edges of the plates are rockably carried by a bar 6 passing through apertures in the plates 3 and through lugs 7 on the rigid frame 8. The cross bars 4 and 5 are themselves interconnected by vertical ties 9 (FIGURE 3) constituting a fender. The lower cross bar 5 is provided at each end with rearwardly projecting pieces 10, which, as will hereinafter be described are capable of being bolted to the rigid frame 8 in order to prevent rocking movement of the sub-frame 2 about the bar 6. The load engaging arms 1, which rigidly carry vertical axes on the sub-frame 2, are mounted so that they can swing about vertical axes in relation to the sub-frame 2. The pillars 11 each carry a bracket 12 which is pivotally mounted on a vertical pin 13 itself mounted between the cross bars 4 and 5, the pins 13 constituting the rocking axes of the load gripping arms 1.

At their free ends the arms 1 carry load engaging members or plates 14, hereinafter referred to as hands, mounted on vertical pins 15. Conveniently the hands 14 are maintained substantially parallel to one another by means of a parallel linkage arrangement (not shown in FIGURES 1 and 2). The brackets 12 provided on the pillars 11 each carry a vertically disposed roller or anti-friction means 17 adapted to engage a horizontally disposed roller 18 as shown in FIGURE 1. The rollers 18 are carried by brackets 19 mounted on a cross piece 20 carried by arms 21. The arms 21 at their ends remote from the cross piece 20 are pivotally carried by the bar 6. A hydraulic jack (not shown) carried by the rigid frame 8 is operatively associated with a cross bar 22 interconnecting the arms 21, the arrangement being such that extension of the jack moves the arms 21 to the right as seen in FIGURE 1.

A pair of vertical tubular pillars 23 are mounted at their free ends on the upper cross bar 4. The pillars 23 carry lugs 24 upon which a pair of bell cranks 25, 26 are pivotally mounted by pins 27. The pivotal mounting of the arms 25, 26 may be adjusted by locating the pins 27 in any of apertures 28 in the lugs 24. The arms 25, 26 will hereinafter be referred to as load steadying arms.

In operation, when it is desired to pick up a load, for example, two pairs of bales of straw, one pair resting on top of the other, the loading vehicle is advanced until the hands 14 lie on each side of the lower pair of bales as in FIGURE 2 and the load steadying arms 25, 26 lie against the upper pair of bales. The hydraulic jack is now extended to urge the rollers 18 forward against the rollers 17 and due to the pivotal mounting of the load gripping arms with respect to the rollers, the former are urged inwards and the hands 14 thus grip the lower bales.

Continued extension of the jack causes the sub-frame 2 to rock about the bar 6 so as to raise the load gripping arms 1 upwards from the ground. Upward movement of the arms 1 and thus of the lower bales causes the upper bales to slip backwards into engagement with the shorter arms 26 of the bell crank load steadying arms so as to cause the arms 25 to engage the sides of the upper bales and to hold them in position during maneuvering of the loading vehicle.

The arrangement is such that the pressure exerted on the sides of the lower part of the load is not greatly in excess of the total weight of the load and the apparatus can therefore safely handle empty crates and the like. The extension of the jack achieves the three objects of gripping the load, tilting it backwards for stability in the longitudinal plane so that it cannot fall forward if the loading vehicle is driven downhill or the brakes applied, and steadying the load in the lateral plane so that the bales cannot fall sideways.

Once the necessary minimum pressure needed to grip the load securely has been applied the sub-frame will start tilting backwards. The wider the load the greater the degree of possible backward inclination of the sub-frame. When no load is encountered by the gripping arms the bar 20 will engage the vertical plates 3 and the remaining stroke of the jack will be expanded solely on tilting the sub-frame. Where, however, very strong gripping is required projecting pieces 10 may be bolted at 29 to the rigid frame 8 to prevent tilting of the sub-frame, so that the force exerted by the extension of the jack is expended solely upon the gripping arms 1.

Referring now to FIGURES 3, 3a, 3b, and 3c this arrangement is similar to that described above with respect to FIGURES 1 and 2, like parts being designated by like reference numerals. However, in this arrangement the load gripping arms 1 are mounted on vertical pillars 30 (FIGURE 3a) pivotally mounted at each end by pins 13 in apertures 31 formed in brackets 32 secured to the cross bars 4 and 5; a plurality of apertures 31 laterally spaced from one another are formed in the brackets 32 whereby the relative lateral spacing of the pillars 30 and thus of the arms 1 may be adjusted to accommodate loads of different widths.

The cross bars 4 and 5 are interconnected by vertical ties 9 and by the plates 3 which carry lugs 33 pivotally mounted on the bar 6. The rearwardly projecting brackets 12 of the apparatus shown in FIGURES 1 and 2, which carry the vertical rollers 17 are replaced in this arrangement by inwardly projecting arms 34 secured to the upper ends of the pillars 30. The arms 21 are replaced by plates 35 which are pivotally mounted between their ends on the bar 6. At their upper ends these arms carry a rigid horizontal cross member 36 which is interconnected by short tension links 37 to the free ends of the inwardly projecting arms 34 on the vertical pillars 30. The pillars 23 are somewhat thinner than the pillars 23 in the first embodiment of the invention. The upper lugs 24 of the first embodiment are formed by the ends of a single horizontal girder 24' fixed to the top ends of pillars 23.

Figure 3A:
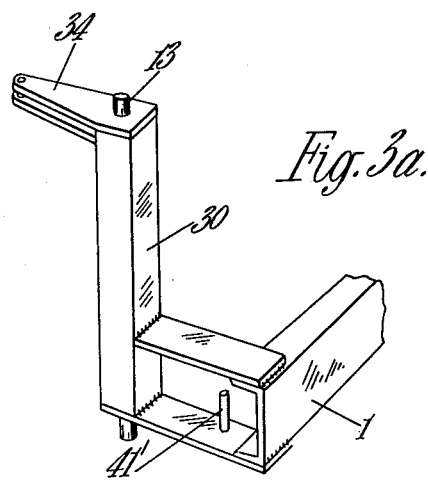
FIGURE 3a shows the detached right-hand arm of the apparatus shown in FIGURE 3.

Although the hands 14 must be capable of pivoting on their mountings on the load gripping arms 1 in order to adjust themselves in relation to the load being carried, it is convenient to maintain them in a substantially parallel aspect to one another. This is achieved by a parallel linkage arrangement, comprising an outwardly projecting lug 39 secured to each hand 14, and a light rod 40 pivoted to this lug. The pivot point of this rod 40 in relation to the hand 14 is about two inches from the pivot pin of the respective hand 14. The other end of the rod 40 is secured to one apex of a triangular bell crank plate 41 pivotally mounted on a pin 41' and at its third apex is pivoted to a further rod 42. As shown in FIGURE 3a the pin 41' is welded to the arms 1. The other end of the rod 42 passes through an eye in an upwardly projecting pin 43 and is spring-biased into a predetermined position with respect to the pin 43 by means of compression springs 44 and 45. In this manner the hands 14 are spring-biased in so that they remain parallel to one another as the arms are opened and closed.

Extension of the jack J whose ram R is connected to the lower ends of the plates 35 by means of cross beams 22, causes the plates to pivot about the bar 6 and pull load gripping arms 1 inwards by means of the tension links 37.

As in the arrangement described with reference to FIGURES 1 and 2 extension of the jack will both cause the arms 1 to grip the lower bales and to incline the sub-frame constituted by parts 3, 4, 5, 23, 24' and 32.

Figure 4:
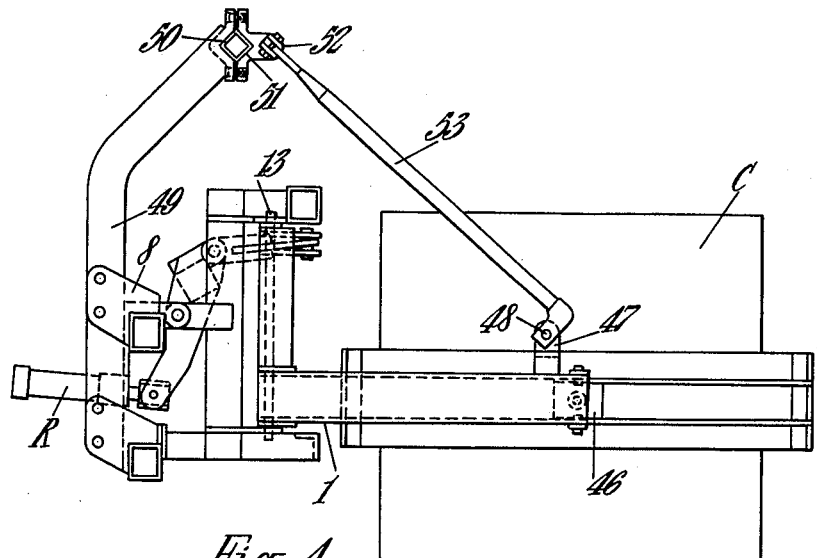
FIGURE 4 is a side elevation of further modified mechanical handling apparatus according to the present invention.
Figure 4A:
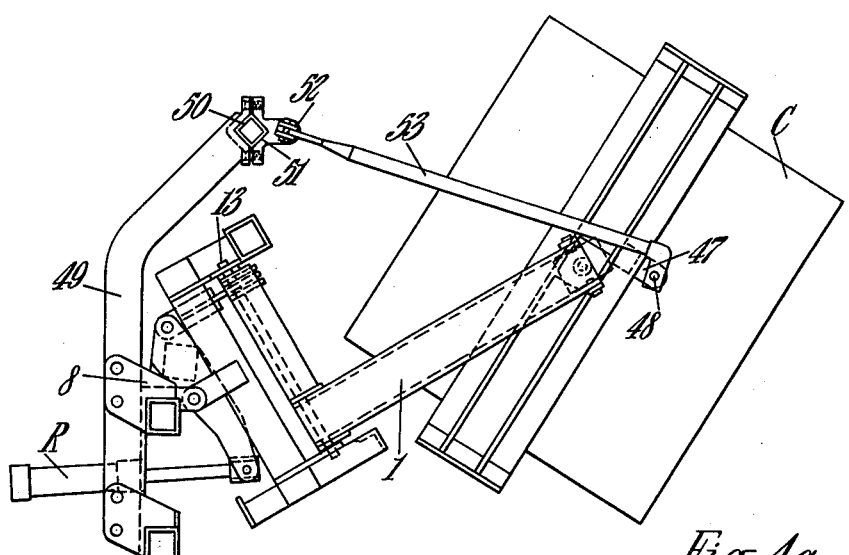
FIGURE 4a is a side view of the apparatus shown in FIGURE 4 after the load has been gripped and the arms tilted upwards.
Figure 4B:
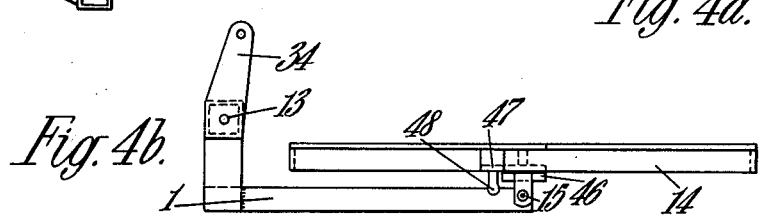
FIGURE 4b is a plan view of part of the apparatus shown in FIGURE 4 showing the mounting of one of its pivoting hands on the corresponding gripping arms.

FIGURES 4, 4a and 4b show a further embodiment of the invention in which the gripping action is combined with means for tipping containers. The hands 14 are pivotally mounted about horizontal axes on plates 46 which are themselves pivotally mounted about vertical axes on pins 15 (see FIGURE 4b). The plates 46 are biased parallel to one another by means similar to those shown in FIGURE 3. The hands 14 carry lugs 47 which provide mountings for ball and socket joints 48.

A pair of upward extensions or standards 49 are attached rigidly to the frame 8, these standards being connected by a cross member 50 to which are attached a pair of brackets 51 each carrying a universal joint 52. The universal joints 52 are connected to the ball and socket joints 48 by inclined links 53. The universal joints 52 are mounted directly above the pins 13 so that the arms can be urged inwards without causing rotation of the hands about their horizontal axes.

The arrangement is such that when a container C has been gripped, further extension of the jack causes the sub-frame 2 to rock about its pivot mounting on the bar 6 and as the load gripping arms 1 are raised the hands are caused to rotate about their horizontal axes until they assume the position shown in FIGURE 4a. It will be seen that in this position the container is rotated so as to discharge its contents. On the retraction stroke of the jack the action of lowering the arms 1 will cause the link 53 to pull the hands 14 into their horizontal position.

While I have described several embodiments of my invention so that those skilled in the art may gain the full advantages of it, it is to be understood that the embodiments are given by way of illustration only and that the monopoly I claim in the United States is to be defined by the gist and spirit of the appended claims.

What I claim is:

1. A load gripping device for loads of the type described in the specification comprising a pair of generally horizontal arms, a frame to which the arms are connected so as to be able to pivot about vertical axes and so as to be able to pivot together about a horizontal axis generally perpendicular to the arms, antifriction abutment means attached to the arms at a position vertically spaced from the horizontal axis, each antifriction means being offset from the axis of the arm to which it is attached, means for engaging these antifriction means so as to push the arms together on to a load between them and then, when the force exerted on the load has reached a certain value, to lift the load by tilting about the horizontal axis with the arms.

2. The structure as set forth in claim 1 further comprising rollers constituting the antifriction means of the arms and further rollers arranged to be moved in a horizontal direction so as to engage the first-mentioned rollers.

3. The structure as set forth in claim 2 in which the arms are provided with pivotally mounted plates for engaging the sides of the load.

4. The structure as set forth in claim 1 comprising bell crank levers mounted on the frame above the arms so as to be able to pivot about vertical axes, the arrangement being such that lifting and tilting of the load carried by the arms causes the load to engage one arm each of the bell crank levers so as to cause the other arms of the bell crank levers to grip the sides of the load and steady it.

5. A load gripping device for loads of the type described in the specification comprising a pair of generally parallel and generally horizontal arms, a frame to which the arms are attached so as to be capable of pivotal movement about vertical axes in relation to the frame, and about a horizontal axis generally perpendicular to the arms, a linkage connected to the sides of the arms, this linkage being arranged to receive a horizontally acting force and cause it to move the arms together against the sides of a load between them, and then, when the force thus exerted on the load reaches a certain value, to lift the load by tilting the arms about the horizontal axis.

6. The structure as set forth in claim 5 further comprising load-engaging plates pivotally attached to the arms.

7. The structure as set forth in claim 6 further comprising parallelogram linkages ensuring that the plates remain mutually parallel, and resilient means for allowing the plates to be pushed out of parallelism when an uneven load is gripped.

8. A load handling device for loads of the type described comprising a frame, a pair of arms mounted on the frame for pivotal movement about vertical axis, and for pivotal movement about a horizontal axis generally perpendicular to the arms, means arranged to move the arms horizontally towards each other to engage a load and then to tilt the arms about the horizontal axis, load-engaging plates on the arms for contacting the sides of the load, these plates being attached to the arms so that they can pivot in relation to them about horizontal axis, and means connecting the plates with the frame in such a manner that when the arms are tilted, as already mentioned, the plates and the load are caused to swivel about a horizontal axis in relation to the arms.

9. The structure as set forth in claim 8, comprising a pair of inclined links, a further frame to which the previously mentioned frame is pivoted, an upward extension on the frame, the upper ends of the links being pivoted to this upward extension while the lower ends of the links are pivoted to the plates at positions spaced from the axis about which the plates are able to pivot in relation to the arms.

References Cited in the file of this patent
UNITED STATES PATENTS

| | | |
|---|---|---|
| 1,437,547 | Pope | Dec. 5, 1922 |
| 1,449,011 | Littefield | Mar. 20, 1923 |
| 1,807,360 | Wehr | May 26, 1931 |
| 2,584,918 | Salsas | Feb. 5, 1952 |
| 2,611,498 | Broersma | Sept. 23, 1952 |
| 2,678,744 | Kruse | May 18, 1954 |